United States Patent [19]

Jannson et al.

[11] Patent Number: 4,838,630
[45] Date of Patent: Jun. 13, 1989

[54] HOLOGRAPHIC PLANAR OPTICAL INTERCONNECT

[75] Inventors: Tomasz P. Jannson; Joanna L. Jannson; Peter C. Yeung, all of Redondo Beach, Calif.

[73] Assignee: Physical Optics Corporation, Torrance, Calif.

[21] Appl. No.: 135,706

[22] Filed: Dec. 21, 1987

[51] Int. Cl.$^4$ ............ G02B 5/32; G02B 6/26; G02B 6/32
[52] U.S. Cl. .................... 350/3.7; 350/96.15
[58] Field of Search .............. 350/3.7, 3.72, 3.73, 350/96.13, 96.15, 96.19; 364/822

[56] References Cited

U.S. PATENT DOCUMENTS

| | | | |
|---|---|---|---|
| 3,879,606 | 4/1975 | Bean | 350/96.15 |
| 4,703,993 | 11/1987 | Hinton et al. | 364/822 |
| 4,705,344 | 10/1987 | Hinton et al. | 364/822 |

OTHER PUBLICATIONS

Goodman et al., Optical Interconnections for VLSI Systems, 72, IEEE, Proc. 7 (1984).
Kostuk et al., Optical Imaging Applied to Microelectronic Chip-to-Chip Interconnections, 24, Applied Optics, 17 (1985).
Bergman et al., Holographic Optical Interconnects for VLSI, 25, Optical Eng'g 10, at 1109, FIGS. 1-3.
Jannson, T. et al., The Internconnectability of Neuro-Optic Processors, SPIE, 698, Real Time Signal Proc. IX (1986).
Jannson, T., Information Capacity of Bragg Holograms in Planar Optics, 71, J. Opt. Soc. Am. 3, (1981).

Primary Examiner—Bruce Y. Arnold
Attorney, Agent, or Firm—Lyon & Lyon

[57] ABSTRACT

An optical interconnect employing planar volume Bragg hologram technology in two dimensions comprises a dichromated gelatin planar volume Bragg hologram disposed in a glass planar optical path. Multiplexed Bragg plane sets selectively diffract information-bearing light signals such as voice, image, or computer data signals in a VLSI system from a laser diode or LED source coupled to the planar optical path toward high-speed photodiodes. The holographic planar optical interconnect can interconnect up to 1000 different signals between VLSI microelectronic components and systems.

19 Claims, 5 Drawing Sheets fig.1.

HOLOGRAPHIC PLANAR OPTICAL INTERCONNECT

BACKGROUND OF THE INVENTION

1. Field of Use

This invention relates generally to an optical interconnect for providing extremely high interconnectibility among very large scale integration (VLSI) microelectronic components and systems.

2. Description of the Prior Art

With decreasing feature sizes and increasing chip sizes in VLSI technology, the ability to interconnect VLSI chips and the boards that carry them is rapidly becoming an industry concern. As a result the industry is turning to optics technology. An overview of this area is provided in Goodman et al., Optical Interconnections for VLSI Systems, 72 IEEE Proc. 7 (1984), and in Kostuk et al., Optical Imaging Applied to Microelectronic Chip-to-Chip Interconnections, 24 Applied Optics 17 (1985). One assessment of the state of the art of optical interconnects for VLSI technology is presented by Bergman et al., Holographic Optical Interconnects for VLSI, 25 Optical Eng'g 10, at 1109, FIGS. 1–3. The optical interconnects described by the above authors are directed to lessening present and future difficulties in providing a sufficient number of off-chip interconnections for large integrated circuits (IC), reducing propagation delays, and altogether eliminating the problem of RC time constants, inductive noise between lines, and line capacitance particular to electronic interconnects. These authors recognize that numerous different optical signals are able to propagate through the same spatial volume without interference. As a result, they have commented on the attractiveness of an optical interconnect architecture and specifically one employing holographic technology.

The holographic interconnects developed to meet the above needs, however, have been based on conventional transmission or reflection Bragg holography including surface etched gratings. These types of holograms (and holography in general) are described by R. Collier et al., Optical Holography (1971), and Kogelnik, 48 Bell Syst. Tech. J.M. 2909 (1969) and Weller et al., Analysis of Waveguide Gratings: A comparison of the results of Rouard's method and coupled-mode theory, 4 J.Opt.Soc.Am. 60 (1987) for surface-etched gratings. In conventional holographic interconnect architecture, the waveguide that carries the signal, the input sources such as laser diodes, and the output receivers such as photodiodes, fibers, or other detectors, are not located in the plane of the hologram but opposed thereto. This type of free-space holographic optical interconnect, described in the above-cited literature incorporated by reference herein, has important limitations. First, alignment problems are critical. If the sources and detectors and waveguide are not in exact alignment with the opposing holographic element, performance suffers possibly to the point where the interconnect becomes inoperative. Second, and more importantly, even when functioning properly the conventional Bragg holography interconnect cannot, in theory or practical use, provide the large number of interconnections needed in the typical VLSI system. A discussion of these important limitations is provided in T. Jannson, et al., "Real Time Signal Processing IX," 698 S.P.I.E. Proc. 157 (1986) which is incorporated herein by reference as are each of the other cited references herein. Surfaced etched holographic gratings, in particular, are not capable of providing a large number of interconnections. It is not possible to record in the same volume numerous independent surface-etched gratings (Bragg plane sets) without mutual cross-talk between light waves diffracted by the surface gratings. In the last analysis, prior art interconnects have not kept pace with the growing need of high interconnectibility between VLSI components.

SUMMARY OF THE INVENTION

An optical interconnect employing planar volume Bragg hologram technology in two dimensions (2-D) is presented. Specifically, a planar volume Bragg hologram is disposed in a planar optical path for providing up to about $10^3$ interconnections between VLSI chips or VLSI boards. A planar optical path provides a means for information-bearing light signals, such as voice, image, or computer data signals, from a source such as an LED or laser diode or a diode array, located off the optical path and connected to a sending chip or board of chips, to propagate to a planar hologram disposed in the optical path. The planar volume hologram contains multiplexed sets of Bragg planes which diffract the light wave propagating through the planar optical path to another portion of the optical path and toward detectors connected to a receiving chip or board of chips situated either on or off the plane of the planar optical path. Up to 1000 distinct sets of Bragg planes can be recorded in the planar hologram, each set recorded in a single holographic exposure, see T. Jannson, Information Capacity of Bragg Holograms in Planar Optics, 71 Journal of Optical Soc. of Amer. 342 (1981), thus providing up to 1000 interconnections between VLSI components.

In one embodiment, a single wavelength light wave can be diffracted in many separate and distinct directions toward various light detectors located off the planar optical path. In another embodiment, a light wave containing many different wavelength signals (a wavelength multiplexed signal) can be diffracted such that each signal is, as a function of wavelength, diffracted in a different direction and to a discrete location on the planar optical path. The various diffracted light signals can then be routed to receiving chips or other microelectronic components as needed. The former embodiment is useful, for example, in distributing a clock signal to VLSI components, and the latter in wavelength-division-multiplexing (WDM) a light signal from one chip to many other chips, or even providing interconnects within single microchips, if necessary.

An optical interconnect in accordance with this invention can achieve extremely high interconnectibility for VLSI chip-to-chip and board-to-board communication, roughly on the order of a hundred times greater than existing optical holographic and nonholographic interconnects. Furthermore, unlike the interconnects constituting the prior art the monolithic nature of the interconnect disclosed herein make it well-suited to compact integrated microelectronic applications and eliminates the alignment problems which exist in fabricating and in using holographic optical interconnects.

In a further embodiment of the invention, the optical interconnect of the present invention is not limited to diffraction of light signals in the plane of the optical path. Coupling means disposed in multiple, parallel planar optical paths can diffract light among each other, passing information in a vertical plane transverse to the plane of each of the planar optical paths. The ability of the holographic plana optical interconnect to achieve extremely high and reliable interconnectibility in an extremely small space is apparent.

BRIEF DESCRIPTION OF THE DRAWINGS

FIGS. 4 (a) and (b) respectively provide a schematic of spherical to planar wave transformation and planar to planar wave transformation;

DESCRIPTION OF THE PREFERRED EMBODIMENTS

Figure 1:
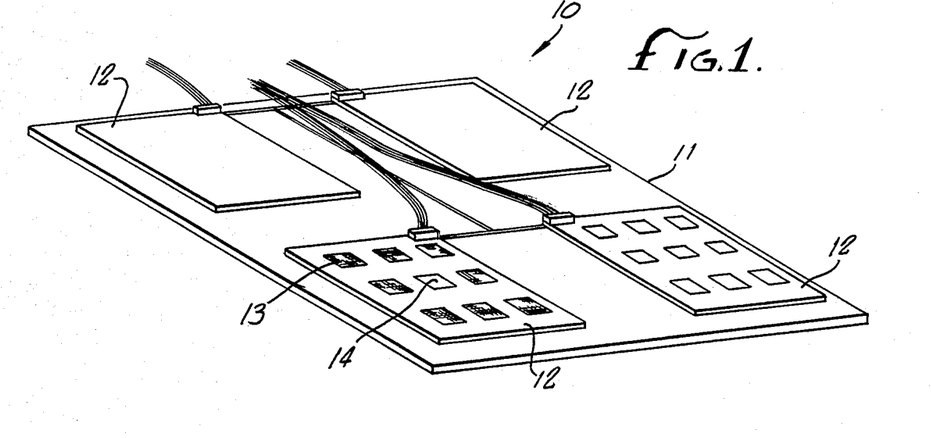
FIG. 1 shows an optical interconnect in accordance with the present invention in its chip-to-chip interconnection capacity in a VLSI system.
Figure 2:
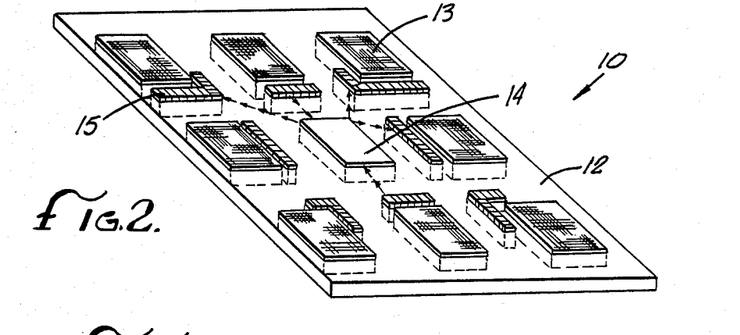
FIG. 2 illustrates the optical interconnect in its chip-to-chip interconnection capacity according to FIG. 1.

Referring to FIGS. 1 and 2, the numeral 10 designates the architecture of a VLSI system containing a metal conductive cooling ground plane 11 supporting four planar optical paths 12 in the form of optical substrates for the transmission of light zig-zag waves containing standard VLSI chips 13, a planar hologram 14 centrally located among the chips 13, and an optoelectronic transceiver 15 associated with each chip. The transceiver 15 comprises a plurality of optoelectronic sources and detectors as will be described below. As seen in FIG. 2, the planar hologram 14 is situated on the planar optical path 12 such that light waves travel unimpeded between the planar hologram and each optoelectronic transceiver 15 at each VLSI chip.

The metal conductive cooling ground plane 11 is standard. The four planar optical paths 12 contained by the ground plane are rectangular and made of transparent optical waveguide material such as glass or a polymer, or a semiconductor or photorefractive material relatively unaffected by continuous exposure to laser light.

The planar hologram 14 is made of a hardenable gelatin such as dichromated gelatin (DCG). DCG has a refractive index of about 1.55, making its combination with a simple glass planar optical path especially advantageous due to the very similar refractive indices of the two materials. Another attractive combination of materials comprising the planar optical path and planar hologram is a monolithic polymer of photorefractive material locally doped (sensitized) where the planar hologram is located. As described below, the planar hologram 14 is fabricated into the planar optical path using state-of-the-art holographic recording techniques. The planar hologram has the same shape as the planar optical path. The thickness of the DCG layer preferably is between 1 μm and 5 μm, and even up to 50 μm.

As also more fully described below, the effective thickness of the DCG layer as a planar Bragg hologram is not its deposition thickness as is the case with both conventional reflection and transmission Bragg holograms but the length of the shortest side of its rectangular perimeter assuming a single-mode waveguide case. This phenomenon is a result of the two-dimensional (2-D) nature of planar holograms; the light waves traveling through planar holograms are restricted to the 2-D space defined by the hologram because their wavefront structure is fixed in the direction transverse to the planar optical path and hologram. Thus, as discussed below, the planar volume Bragg hologram of the present invention far surpasses expected interconnectibility limits using conventional non-planar Bragg holograms because the effective Bragg thickness of the planar hologram is increased many times with respect to the thickness of the DCG layer. Of course, the invention can be used in low-interconnectivity applications as well.

The VLSI chips 13 are state-of-the-art integrated circuits having a large number of pin connections at their periphery. The optoelectronic transceiver 15 for each chip is a combination of light sources and detectors. The sources are single laser diodes or LEDs. The sources are arranged as a light array if numerous non-multiplexed light signals are to be coupled into the optical interconnect. The detectors typically are single high-speed photodiodes that are arranged as a detector array as needed.

Figure 3A:
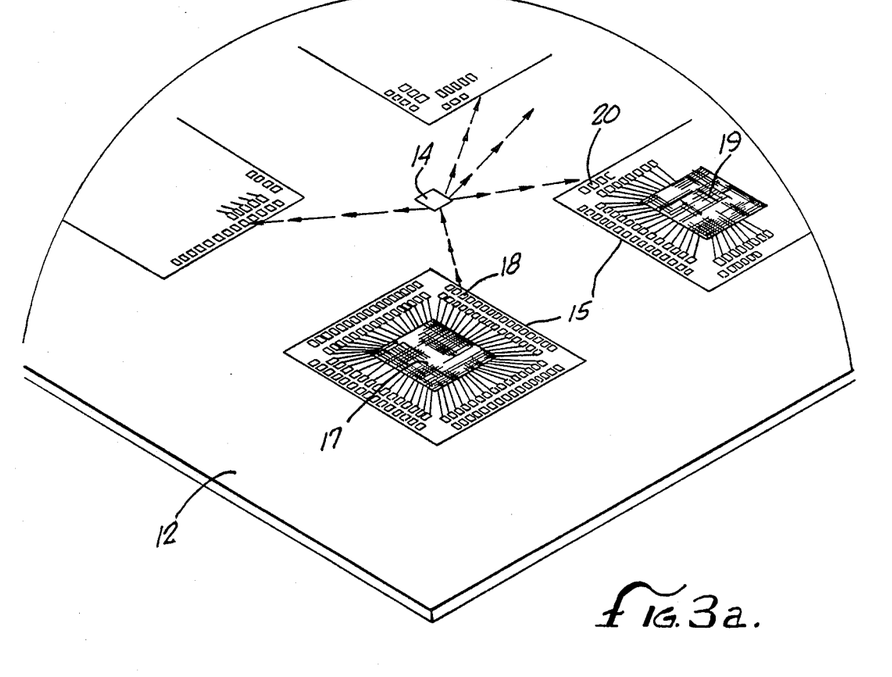
FIG. 3(a) is an expanded view of FIG. 3(b) and FIG. 3(b) illustrates an interconnect in accordance with the present invention in an enclosure.
Figure 3B:
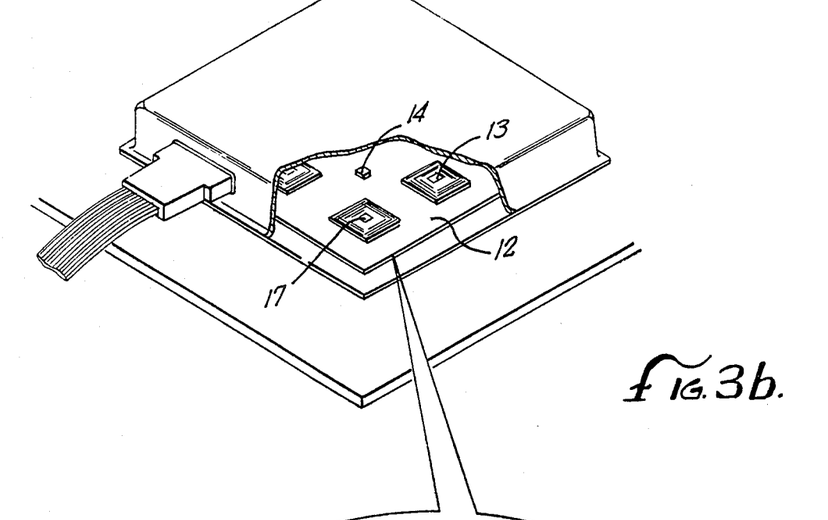

The interconnect architecture of FIGS. 1 and 2 may be employed in a fan-out or fan-in interconnect system as shown in FIG. 3(a) and FIG. 3(b). In a fan-out system, one VLSI chip designated 17 serves as the source of signal information. The electronic signal from that chip is converted into a light signal by an optoelectronic source 18 in the transceiver 15 (which functions the same as transceiver 15 in FIG. 2) associated with the chip and then coupled into the planar optical path 12. The light signal propagates in the planar optical path as a zig-zag wave, totally reflecting off the upper and lower interior planar surfaces of the planar optical path, toward the planar hologram 14. Upon reaching the planar hologram 14, the signal is diffracted toward the various receiving chip or chips by the Bragg planes (including curved Bragg surfaces for holographic optical elements (HOE) used in focusing, concentrating, collimating and other lens-like operations) recorded in the planar hologram. The signal light wave traveling toward a receiving chip 19 is incident on a detector 20 in the transceiver 15 associated with that chip. The detector converts the light signal into an electronic one for use in the receiving VLSI chip or board.

Figure 4A:
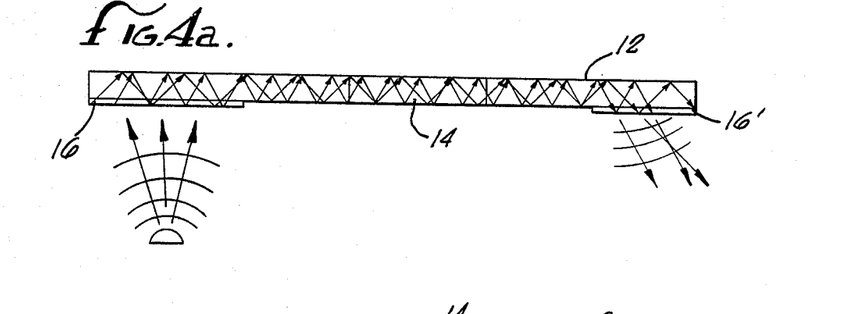

If transceiver 15 is disposed in the same planar optical path so as to directly pick up the light signals, either no coupling means is needed or conventional planar coupling can be applied. Where vertical coupling of the light signals between the transceiver 15 and the planar optical path 12 is necessary, it can be accomplished using coupling means such as total internal reflection (TIR) holograms bonded to the planar optical path, or coupling prisms, or holographic gratings, which function to transform the light wave from motion in 3-D-space to that in 2-D-space. FIG. 4(a) specifically illustrates the transformation of light waves as they are coupled into and out of the planar optical path 12 by coupling means 16 and 16′ attached to the underside of planar optical path 12. Spherical 3-D waves emanating from the source at the left are incident the coupling means 16. After entering the coupling means, the waves are transformed to zig-zag waves which totally reflect off the upper and lower interior surface of the planar optical path 12 as they propagate along the planar optical path.

Figure 4B:
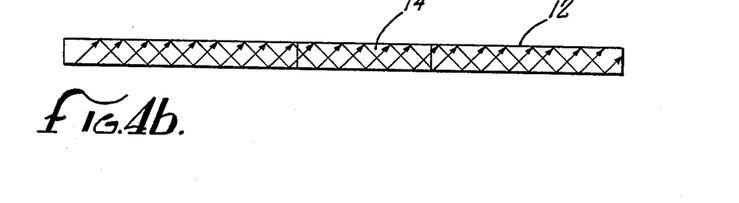

As the zig-zag waves propagate into the portion of the planar optical path having coupling means 16′, the reverse occurs. The waves are transformed from planar 2-D space into 3-D waves that disperse somewhat as they exit the coupling means 16′. It can be seen in FIG. 4(b) that the light signal propagating in the planar optical path 12 remains a planar 2-D wave as it passes through and exits the planar hologram 14.

Figure 5:
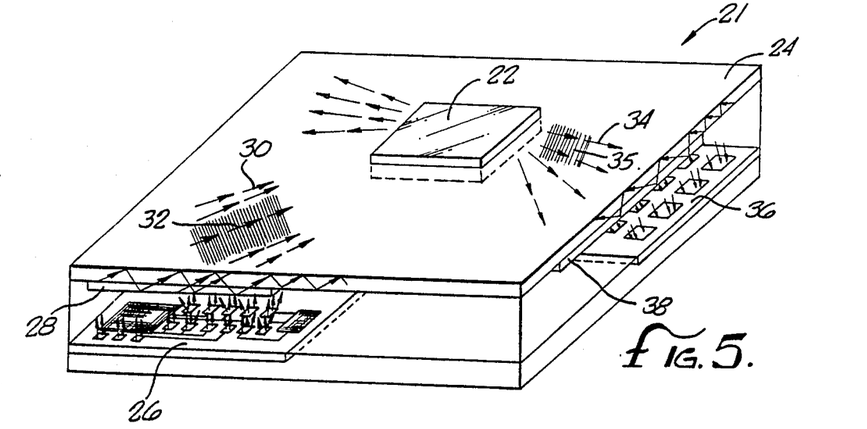
FIG. 5 illustrates the structure of the optical interconnect in accordance with the present invention.

As best seen in FIG. 5, an optical interconnect 21 includes a planar hologram 22 which is situated centrally in the planar optical path 24. A source, specifically a laser diode array 26, is located below the underside of the planar optical path. A coupling means 28, specifically a TIR hologram, is situated between the laser diode array and the planar optical path and is bonded to the underside of the planar optical path. The laser diode array is of the VLSI type and converts electronic signals from VLSI chips (not shown) to light signals. The light emitted from the laser diode array 26 is in the form of spherical waves emanating outwardly from the diode array, and is incident upon coupling means 28. The coupling means transforms the spherical light waves into planar 2-D waves having wave front 32 which propagate through the planar optical path in the direction of the planar wave vectors 30 and planar wave front 32 toward the planar hologram 22. The light waves represented as wave vectors 30 are diffracted upon encountering planar hologram 22 by the Bragg planes that were recorded therein during fabrication or holographic recording of the hologram. The diffracted light waves propagate outwardly from the planar hologram as wave front 35 in the direction of planar wave vectors 34 toward another coupling means 38 bonded to the undersurface of the planar optical path 24. Coupling means 38 transforms the planar wave signal represented by wave vectors 34 and wave front 35 from a planar wave into a spherical wave which exits the coupling means 38. The exiting spherical wave is detected by the high speed photodetector array 36 situated below the underside of the planar optical path 24, on the same plane but separated from the source laser diode source array 26. Photodetector array 36 thereafter converts the spherical waves into an electronic signal which propagates to a VLSI chip or board.

The optical interconnect 21 of FIG. 5 can be used in both single wavelength and multi-wavelength systems. In a single wavelength system, for instance, a clock signal comprising a single wavelength light wave supplied by a laser diode 26 would be coupled into the planar optical path 24 by the coupling means 28. Upon encountering planar hologram 22, the single wavelength signal is diffracted in up to about 1000 distinct directions depending on the number of Bragg plane sets recorded in the hologram during fabrication. Each diffracted light wave is picked up by an individual photodiode in high speed photodetector array 36 for distribution to up to 1000 different VLSI chips or other components requiring the clock signal. This extremely high number of interconnections, heretofore unattainable, is possible because of the extremely high angular Bragg selectivity afforded by the planar volume holographic structure of the optical interconnect 21 as further described below. Moreover, clock operation is not degraded at high frequency ($>1$ GHz) as is the case with electronic clocks.

Figure 6A:
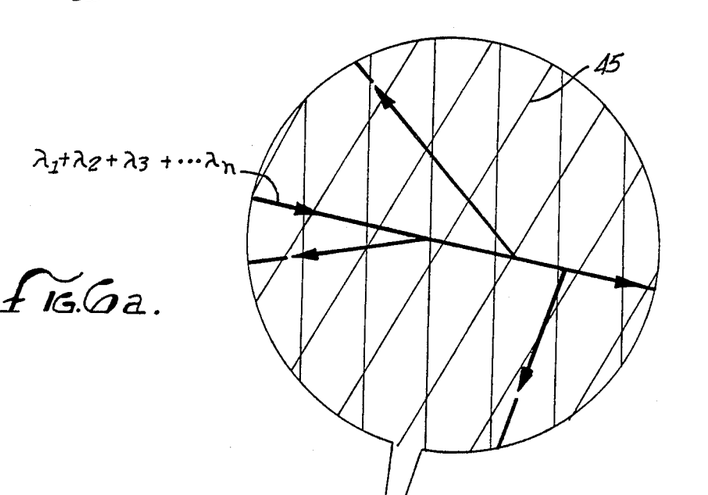
FIG. 6(a) is an expanded view of FIG. 6(b) and FIG. 6(b) illustrates the optical interconnect of FIG. 1 in use as a high-channel density wavelength division multiplexer (WDM)
Figure 6B:
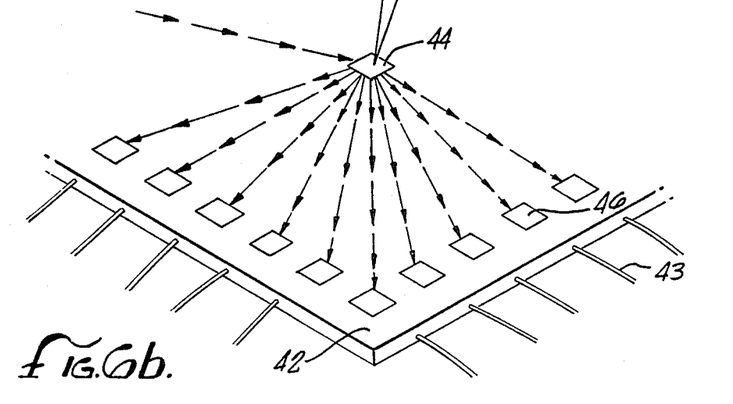

In a multi-wavelength application, the optical interconnect 21 can be used, for example, as a multi-channel wavelength, division or demultiplexer as shown in FIG. 6(a) and FIG. 6(b). A composite multiplexed wave comprised of wavelengths $\lambda_1 + \lambda_2 + \lambda_3 \ldots \lambda_n$ propagating through the planar optical path 42 and incident upon the multiplexing planar hologram 44 can be seen in FIG. 6. The individual wavelength components of the composite multiplexed wave are diffracted to their respective coupling means 46 and coupled out of the planar optical path 42 into fiber optics 43. The multiplexing planar hologram 44 in such a case comprises a set of Bragg planes for each wavelength component of the composite light wave. The Bragg plane sets 45 are recorded separately in the multiplexing planar hologram 44 by state-of-the-art fabrication techniques. Each set of Bragg planes, consisting of a single planar Bragg grating, in the planar hologram is responsive to only one wavelength of the composite multiplexed wave and diffracts that wavelength of the light signal to a discrete location on the planar optical path 42 so that it can be picked up by a discrete receiving element such as coupling means 46 and routed through fiber optics 43 to a receiving VLSI chip or board.

Figure 7:
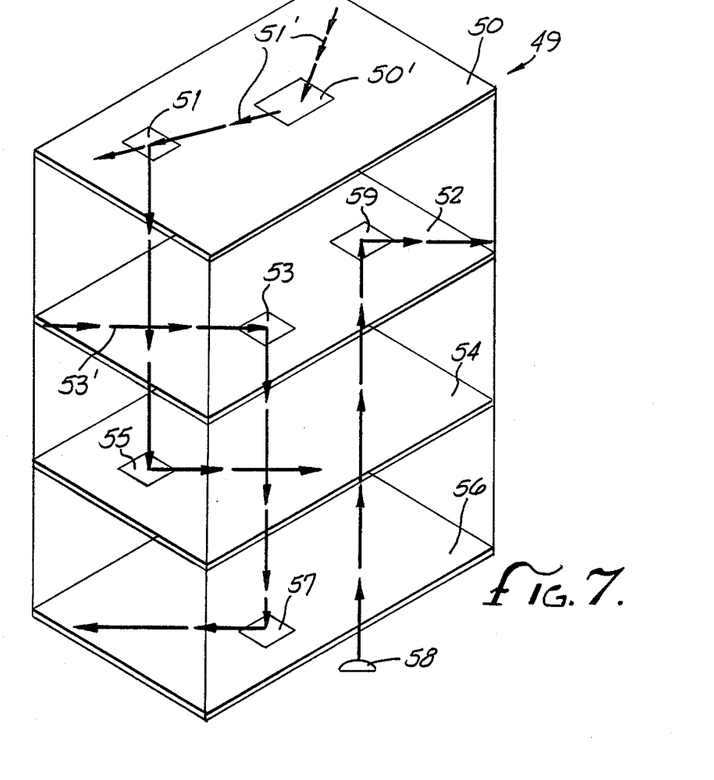
FIG. 7 is a schematic diagram of a multiplanar optical interconnect in accordance with the present invention.

The multiplanar optical interconnect 49 shown in FIG. 7, comprises a plurality of spaced, parallel planar optical paths designated 50, 52, 54, 56 each having coupling means such as TIR or conventional coupling elements respectively disposed therein at nodes 51, 53, 55, 57, 59. Light waves can be diffracted in both the plane of the planar optical paths 50, 52, 54, 56 by planar volume Bragg holograms and in the vertical plane transverse to those planar optical paths by the coupling means. For example, signal light wave 51′ propagating from right to left in the uppermost planar optical path after being diffracted in that planar optical path by a planar hologram 50′ encounters the coupling means disposed therein at node 51. The light wave is directed downward vertically through the second uppermost planar optical path 52 into the coupling means disposed at node 55 in the third uppermost planar optical path 54. The coupling means at node 55 in turn diffracts light wave 51′ horizontally to the right for propagation along planar optical path 54. At the same time, a light wave 53′ traveling from left to right in the planar optical path 52 encounters the coupling means at node 53 therein and is diffracted downward vertically through the planar optical path 54 to the coupling means disposed at node 57 in the planar optical path 56. The light wave 53′ thereafter is diffracted to the left by the coupling means at node 57 for propagation along the lowermost planar optical path 56. Still further, a light wave emanating from the laser diode source 58 upwardly through the lowermost planar optical path 56 and the planar optical path 54 immediately above it encounters the coupling means disposed at node 59 in the planar optical path 52 and is diffracted to the right for propagation along that planar optical path. As can be seen from FIG. 7, then, extremely high and flexible interconnectibility can be achieved by the optical interconnect 49 in an extremely small space.

Figure 8:
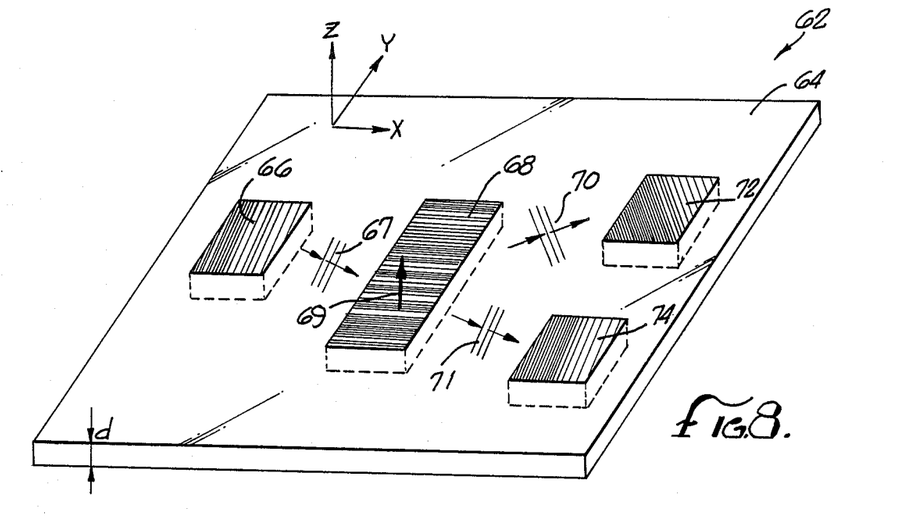
FIG. 8 is a schematic diagram of the optical interconnect in its elementary form providing a 1:2 fan-out.

Each of the above embodiments can be implemented using state-of-the-art optics and holographic fabrication technology. Referring to FIG. 8, the elementary case of the optical interconnect is shown for purposes of describing the physics of an optical interconnect in accordance with the present invention. The optical interconnect generally designated 62 comprises a planar optical path 64 containing a source coupling means 66 disposed in or bonded to the underside of the planar optical path, a planar hologram 68 with its attendant planar grating vector 69 oriented in a vertically upward fashion perpendicular to the plane of each Bragg plane, and two output coupling means 72 and 74.

A signal light wave from a laser diode (not shown) is coupled into planar optical path 64 through coupling means 66. The planar wave exiting the coupling means 66 is characterized by wave vector and wave front 67. The light wave represented by wave vector and wave front 67 is diffracted by the planar hologram 68 in one direction, corresponding to wave vector and wave front 70. The second wave vector and wave front 71 corresponds to the non-diffracted portion of the light wave 67. The diffracted wave, propagating toward the coupling means 72, is transformed from a planar wave into a spherical wave and coupled out of the planar optical path 64 by coupling means 72. The non-diffracted light wave, represented by wave vector and wave front 71, propagates toward coupling means 74 and is transformed from a planar wave into a spherical wave and coupled out of the planar optical path 64 by coupling means 74.

The planar optical path 64 is a standard transparent optical waveguide in an elongated, rectangular, low profile form and preferably made of glass. Its thickness for a single mode case is about 10 μm. The planar hologram 68 is a volume hologram preferably made of dichromated gelatin (DCG). Because of the thin, planar structure of the optical interconnect, the structure of waves propagation through the planar optical path 64, transverse to the plane of planar optical path 64, is fixed (assuming a single-mode case). In other words, the usual three-dimensional (3-D) wave motion is reduced to 2-D planar motion as is fully described in T. Jannson, Information Capacity of Bragg Holograms in Planar Optics, 71 Journal of Optical Soc. of Amer. 342 (1981). Assuming the thickness of the planar optical path 64 is increased to more than 10 μm, a multi-mode case is presented. In the latter case, many waveguide modes are accepted by the planar optical path. If the planar optical path thickness is increased to more than 100 μm, the mode structure becomes continuous.

Verber et al., 10 Ferroelectronics 253 (1976) and Vahey et al., 139 Signal Processing I.E. 151 (1976) additionally describe the recording of planar holograms by the interference of two waveguided waves as occurs during fabrication of the planar hologram 68. Recording Bragg holograms in the case of 2-D planar wave motion is also described by T. Jannson in Information Capacity of Bragg Holograms in Planar Optics, cited above. The photochemistry and optics of recording DCG holograms is described in Topics in Appl. Phys., Vol. 20, "Holographic Recording Materials" (H. Smith, Ed. 1977). As stated above, each of these references is incorporated by reference herein.

"Bragg thickness", $T_\beta$, is an important parameter of the holographic planar optical interconnect. Assuming that the planar hologram 68 is disposed such that it fills the planar optical path 64, the length of the shortest side of the perimeter of the planar hologram, preferably in the range of 1 mm.–1 cm., can be considered the Bragg thickness, $T_\beta$, of the hologram. Importantly, the Bragg thickness of conventional Bragg holograms is controlled by the deposition thickness of the hologram, not perimeter size. Deposition thickness in conventional Bragg holography is in the range of 20 μm–30 μm and is significantly smaller than the perimeter size of a planar Bragg hologram, thus yielding a smallar Bragg thickness in the conventional case. As is fully described in T. Jannson, Information Capacity of Bragg Holograms in Planar Optics, Bragg thickness determines two parameters that in turn directly affect the number of interconnections the optical interconnect 62 can provide. The two parameters are Bragg selectivity (angular) and wavelength selectivity of the planar hologram 68.

Bragg selectivity is determined by the Bragg selectivity angle, $\Delta\theta_\beta$, which is the minimum angle that must be maintained between reference beams during recording of the Bragg plane sets in the planar hologram during fabrication to avoid cross-coupling between adjacent Bragg plane sets giving rise to unwanted cross-talk between information channels. As seen by the relationship between the minimum Bragg selectivity angle $\Delta\theta_\beta$ and planar hologram thickness, $$\Delta\theta_B \sim \frac{\lambda}{nT_\beta} \quad (1)$$

as Bragg thickness, $T_\beta$, increases, the minimum Bragg selectivity angle must decrease for a given wavelength of light. For example, for $T_\beta=1$ cm, n=1.55 (DCG), and $\lambda=1$ μm, then $\Delta\theta_\beta<10^{-4}$. In the single wavelength case, this means that more independent holographic Bragg planes can be recorded in the planar hologram 68 as $T_\beta$ increases. This in turn increases the number of interconnections that the optical interconnect can provide among VLSI components with minimum cross-talk. In the multi-wavelength case, interconnectibility is basically determined by wavelength selectivity defined by $$\frac{\Delta\lambda}{\lambda} = \frac{\Delta n}{n} \quad (2)$$

For example, for $\lambda=1$ μm, n=1.55, and $\Delta n=0.001$, then $\Delta\lambda=0.6$ nm.

The particular case of Lippman-Bragg holograms is considered for both Eqs. 1 and 2 to obtain an estimate of the number of connections that a planar volume Bragg hologram in accordance with the present invention can provide. Lippman-Bragg holograms comprise Bragg planes that are parallel to at least one edge of the hologram Although Eqs. 1 and 2 hold specifically for Lippman-Bragg holograms, they approximately hold for Bragg reflection holograms in general because in both cases angular and wavelength selectivity increase as $T_\beta$ increases. First, the efficiency, D, of the hologram determines what percentage of light entering the hologram is diffracted. It is determined for the Bragg case by the coupling constant $\gamma$: where Kogelnik's equations provide $$D = \tanh^2\gamma \quad (3)$$

and

-continued $$\gamma = \frac{\pi \cdot \Delta n \cdot T_\beta}{\lambda}. \quad (4)$$

For holographic efficiency of 99%, 0.99 is substituted for D in Eq. 3 to yield $\gamma = \pi$. Substituting $\pi$ for $\gamma$ in Eq. 4 yields the relation $$\frac{\Delta n \cdot T_\beta}{\lambda} = 1 \quad (5)$$

which means that in order to maintain extremely high efficiency in Lippman-Bragg holograms, the product of the refractive index modulation and Bragg thickness divided by the wavelength must be higher than unity. For a given wavelength, it can be seen that as $\Delta n$ decreases, T must increase to preserve high diffraction efficiency. Assuming the 2-D Bragg thickness $T_\beta$ is 1000 times greater than $T_\beta$ in a conventional Bragg hologram, the refractive index modulation will be 1000 times smaller in the 2-D case than in the free-space 3-D case. Thus, a decrease in $\Delta n$ affects wavelength selectivity defined by Eq. 2. As $\Delta n$ in Eq. 2 is decreased, wavelength selectivity increases, thus increasing the number of interconnections that the optical interconnect can provide in the multi-wavelength case.

In the single-wavelength case where interconnectibility is determined by Eq. 1 and in the multi-wavelength case where interconnectibility is determined basically by Eq. 2, and efficiency in both is determined approximately by Eq. 5, it can be seen that to improve interconnectibility of the optical interconnect 62 in both cases, $T_\beta$ should be increased. These equations yield up to about 1000 interconnections for a single-wavelength case optical interconnect and up to about 1000 interconnections for a multi-wavelength case optical interconnect. Interconnectibility drops off in both cases as the planar hologram 62 is disposed less into the planar optical path.

Figure 9:
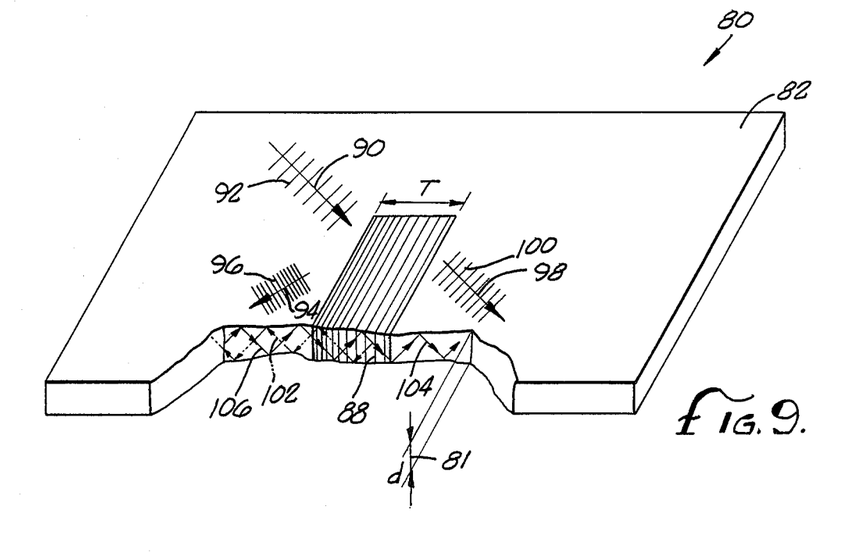
FIG. 9 is a schematic cross-sectional view of an optical interconnect in accordance with the present invention.

Referring to FIG. 9, a reflection optical interconnect 80 is shown. The interconnect comprises planar optical path 82 and a Bragg-Lippman planar hologram 84 having parallel Bragg planes 86. Vertical projections of the Bragg planes 86 are designated 88. It is seen that the coating thickness of the DCG planar hologram is equal to the thickness d, designated 81, of the planar optical path 82. In other words, the planar hologram fills the vertical projection of the planar optical path.

The planar wave vector 90 and planar wave front 92 incident upon the planar hologram 84 are diffracted by the planar hologram. Diffraction splits the planar wave front 92 into wave front 96 and wave front 100 having wave vectors 94 and 98 respectively. The light wave represented by wave vector 94 is the diffracted or reflected portion of the light wave represented by wave vector 90. The light wave represented by wave vector 98 is the transmitted portion of the light wave represented by wave vector 90. The vertical projections of the wavefront 96 associated with wave vector 94 are zig-zag waves 102 reflecting back from the planar hologram 84. The vertical projections of the wave front 100 associated with wave vector 98 are shown as zig-zag waves 104 passing or being transmitted through planar hologram 84. The vertical projections of the original incoming wave front 92 associated with wave vector 90 are zig-zag waves 106. It should be emphasized that, according to FIG. 9, the hologram Bragg thickness, $T_\beta$, as used in Eq. 5 is equal to the length of the shortest horizontal side, T, of the hologram only if the planar hologram totally fills the planar optical path thickness d, and only for the single-mode case. In other cases, however, where $T_\beta < T$, both angular and wavelength selectivities will be reduced in accordance with Eq. 5.

Figure 10:
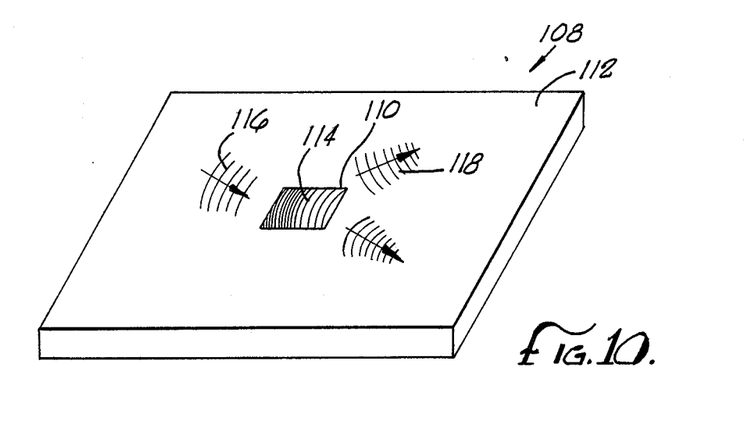
FIG. 10 illustrates the present invention as a holographic optical element.

Referring to FIG. 10, an elementary fan-out optical interconnect holographic optical element (HOE) 108 is shown as a further embodiment of the present invention. The planar hologram 110 disposed in the planar optical path 112 comprises curved Bragg surfaces 114, recorded by state-of-the-art techniques. The curved Bragg surfaces of the planar hologram 110 focus and diffract the incoming light wave 116. The diffracted portion of the light wave 116, designated 118 is focused by the curved Bragg surfaces 114. Thus the HOE embodiment of the optical interconnect provides not only fan-out but focusing and other lens-like capabilities.

It is to be understood that embodiments of the present invention not disclosed herein are fully intended to be within the scope of the claims.

What is claimed is:

1. An optical interconnect comprising
    a planar optical path for planar light waves, having input and output portions, and
    a planar volume Bragg hologram disposed in the planar optical path, the Bragg hologram comprising Bragg surfaces which diffract the planar light waves from the input portion to the output portion.

2. The invention as defined in claim 1, wherein the Bragg hologram is made of dichromated gelatin.

3. The invention as defined in claim 1, wherein the planar optical path is made of glass.

4. The invention as defined in claim 1, wherein both the planar optical path and the planar volume Bragg hologram comprise the same optical material and wherein the material in the area of the Bragg hologram is additionally sensitized.

5. The invention as defined in claim 1, wherein the hologram comprises curved Bragg surfaces which focus and diffract the light waves from the input portion to the output portion.

6. The invention as defined in claim 1, wherein the planar Bragg hologram comprises sets of Bragg planes which diffract a single wavelength clock signal to discrete locations in the output portion.

7. The invention as defined in claim 1 wherein the planar Bragg hologram comprises sets of Bragg planes which diffract each component wavelength of light in a multiplexed multi-wavelength light signal to discrete locations in the output portion.

8. An optical interconnect comprising
    a planar optical path for planar light waves, having input and output portions,
    means for coupling 3-D light waves incident the input portion into the planar optical path and transforming the 3-D light waves into planar light waves,
    a planar volume Bragg hologram disposed in the planar optical path,
    the hologram comprising Bragg surfaces which diffract the planar light waves from the input portion to the output portion, and
    means for transforming the diffracted planar light waves at the output portion into 3-D light waves and coupling the 3-D light waves out of the planar optical path.

9. The invention as defined in claim 8, wherein the means for coupling and transforming is a total internal reflection hologram.

10. The invention as defined in claim 8, wherein the means for transforming and coupling is a total internal reflection hologram.

11. An optical interconnect comprising
a planar optical path for planar light waves, having input and output portions,
a source of 3-D light waves, functionally connected to the input portion,
a planar volume Bragg hologram disposed in the planar optical path,
the Bragg hologram comprising Bragg surfaces which diffract the light waves from the input portion to the output portion, and
means for detecting the diffracted planar light waves functionally connected to the output portion.

12. The invention as defined in claim 11, wherein the signal light source is not located in the plane of the planar optical path.

13. The invention as defined in claim 11, wherein the means for detecting is a photodiode.

14. The invention as defined in claim 11, wherein the means for detecting is not in the plane of the optical path.

15. The invention as defined in claim 11, wherein the signal light source is a laser diode.

16. The invention as defined in claim 11, wherein the signal light source is an LED.

17. An optical interconnect comprising
a plurality of spaced, parallel planar optical paths for the propagation of planar light waves, each having input and output portions, and
means disposed in each planar optical path for diffracting the planar light waves from the input portion to the output portion of a planar optical path and for diffracting the planar light waves from the means in one planar optical path to the means in another planar optical path.

18. In a system containing a plurality of VLSI integrated components, means for functionally interconnecting the components comprising
a planar optical path containing the components thereon,
means for converting the electronic signals generated by the components to light signals,
input means for coupling the light signals into the planar optical path,
output means for coupling the light signals out of the planar optical path,
planar volume holographic means for diffracting the light signals from the input means to the output means, and
means for converting the light signals at the output means into electronic signals for use by the components.

19. A method of interconnecting electronic signals generated by a plurality of VLSI integrated components comprising
converting the electronic signals to light signals,
coupling the light signals into a planar optical path,
diffracting the coupled light signals in a planar volume Bragg hologram recorded with a plurality of Bragg plane sets, and disposed in the planar optical path,
coupling the diffracted light signals out of the planar optical path and converting the decoupled light signals to electronic signals, and
routing the electronic signals to VLSI components.

* * * * *